United States Patent [19]

Ackermann et al.

[11] Patent Number: 5,483,578
[45] Date of Patent: Jan. 9, 1996

[54] METHOD OF MANAGING A SPEECH MEMORY, AND ASSEMBLY THEREFOR

[75] Inventors: Uwe Ackermann, Freiberg; Dieter Kopp, Hemmingen; Thomas Hörmann, Grossbottwar, all of Germany

[73] Assignee: Alcatel Sel Aktiengesellschaft, Stuttgart, Germany

[21] Appl. No.: 315,980

[22] Filed: Sep. 30, 1994

[30] Foreign Application Priority Data

Oct. 8, 1993 [DE] Germany .......................... 43 34 313.9

[51] Int. Cl.⁶ ................................................ H04M 3/50
[52] U.S. Cl. ........................... 379/67; 379/88; 395/600; 395/2.1; 395/2.84
[58] Field of Search ...................... 395/425, 600, 395/2.1, 2.84, 2.79; 379/67, 88, 89

[56] References Cited

U.S. PATENT DOCUMENTS

| | | | |
|---|---|---|---|
| 3,643,225 | 2/1972 | Rice et al. | 235/157 |
| 4,573,140 | 2/1986 | Szeto | 364/900 |
| 4,640,991 | 2/1987 | Matthews et al. | 379/88 |
| 4,675,840 | 6/1987 | Raymond et al. | 364/200 |
| 4,985,914 | 1/1991 | Fukunaga | 379/89 |
| 5,117,451 | 5/1992 | Ladd et al. | 379/67 |
| 5,125,022 | 6/1992 | Hunt et al. | 379/88 |
| 5,193,180 | 3/1993 | Hastings | 395/575 |

(List continued on next page.)

FOREIGN PATENT DOCUMENTS

| | | |
|---|---|---|
| 0282787 | 9/1988 | European Pat. Off. . |
| 0446940 | 9/1991 | European Pat. Off. . |
| 0485980A2 | 5/1992 | European Pat. Off. . |
| 0557813 | 9/1993 | European Pat. Off. . |
| 3221685A1 | 12/1983 | Germany . |
| 4118623A1 | 12/1992 | Germany . |
| 4204929A1 | 8/1993 | Germany . |

OTHER PUBLICATIONS

TENCON '89, Fourth IEEE Region 10 International Conference 22 Nov. 1989, Bombay, India, pp. 503–506, Pande et al "A PC Based Voice Mailing System".

Richard A. Varga and Michael A. Harrison, "Dynamic Storage Allocation" 1968, pp. 435 to 451, *The Art of Computer Programming*, Addison–Wesley Publishing Company, Inc., Reading, Mass.

L. A. Belady, R. P. Parmelee and C. A. Scalzi, "The IBM History of Memory Management Technology", 1981, pp. 491 to 503, International Business Machines Corporation.

Jack B. Dennis, "Segmentation and the Design of Multiprogrammed Computer Systems", IEEE International Commission Review, vol. 13, 22–26, 1965, pp. 214–225.

Himmi Hattori, Shuzo Morita, Yoshinobu Fujii and Moo Wan Kim, "A Design Model for a Real–Time Voice Storage System", IEEE Transactions on Communications, vol. COM–30, No. 1, Jan. 1982, pp. 53–57.

Article entitled The IBM History of Memory Management by L. A. Belady, et al, IBM J. Res. Develop. vol. 25, No. 3 Sep., 1981, pp. 491–503.

Article entitled The Art of Computer Programming by E. Donels Knuth, vol. 1/Fundamental Algorithms, 1969, Addison–Wesley Publishing Comp. pp. 435–451.

*Primary Examiner*—Jeffery A. Hofsass
*Assistant Examiner*—Parag Dharia
*Attorney, Agent, or Firm*—Frishauf, Holtz, Goodman, Langer & Chick

[57] ABSTRACT

A method of managing a speech memory (VMEM) and an assembly therefor are disclosed. To enable a plurality of users (U1, U2, U3, U4) to access the speech memory, the latter is divided into user memory areas (S1, S2, S3, S4) and a common memory area (SALL). By adding a portion (S4') of the common memory area (SALL) to one of the user memory areas (S4') or vice versa, the size of this user memory area is adapted to the memory space requirements (Min4) of the user (U4). The capacity of the speech memory (VMEM) is effectively utilized, since, as far as possible, no free memory space is assigned to the users (U1 to U4) which will not be used by them. The assembly can be used, for example, as a voice mailbox in a telecommunications system.

11 Claims, 5 Drawing Sheets

U.S. PATENT DOCUMENTS

| | | | |
|---|---|---|---|
| 5,247,634 | 9/1993 | Cline et al. | 395/425 |
| 5,247,674 | 9/1993 | Kogure | 395/650 |
| 5,325,421 | 6/1994 | Hou et al. | 379/67 |
| 5,339,411 | 8/1994 | Heaton, Jr. | 395/600 |
| 5,384,834 | 1/1995 | Sato et al. | 379/88 |

METHOD OF MANAGING A SPEECH MEMORY, AND ASSEMBLY THEREFOR

BACKGROUND OF THE INVENTION

1. Field of the Invention

Speech memories are used where digital recording of speech is desired. That is the case, for example, in speech recognition systems, voice messaging systems, or voice mailboxes.

2. Description of the Prior Art

U.S. Pat. No. 4,985,914 discloses a voice storage system for a telecommunications facility. It describes a processor-controlled circuit for controlling access by a plurality of users to a hard disk serving as a speech memory. An implementation of the speech memory as a semiconductor memory is not described, nor is the management of the speech memory described. It is important, however, to manage such a speech memory so that its capacity is utilized as effectively as possible.

SUMMARY OF THE INVENTION

It is, therefore, the object of the invention to provide a method of managing a speech memory, an assembly therefor, and telecommunications facilities with this assembly.

According to an aspect of the present invention, a method for managing a speech memory that is accessible by a plurality of users, comprises dividing the speech memory (VMEM) into a plurality of user memory areas (S1, S2, S3 and S4), and a common memory area (SALL), each user memory area having a variable size. The dividing step comprises allocating, in a first allocating step (step 102), a respective one of the plurality of user memory areas (S1, S2, S3, S4) to each of a plurality of users (U1, U2, U3, U4); and allocating in a second allocating step (step 103), at least a portion of the common memory area (SALL), which comprises a memory area of the speech memory (VMEM) remaining after the first allocating step, to each of a plurality of users (U1, U2, U3 and U4) requiring an additional memory area. The method further comprises adjusting a size of a user memory area allocated in the first allocating step within predetermined limits so as to adapt (steps 111 through 122) the memory area allocated to each user to an actual memory area required by each user (U1, U2, U3, U4). The adjusting step includes allocating, in a third allocating step, at least a portion (S4') of the common memory area (step 118) to that user memory area (S4) allocated to that one of the users (U4) requiring the additional memory area; and then retransferring the at least a portion (S4') of the common memory area back to the common memory area (SALL) when the at least a portion (S4') of the common memory is no longer needed to store data for that one of the users previously requiring the additional memory area (S4').

According to another aspect of the present invention a memory apparatus comprises: a speech memory, that is accessible by a plurality of users; and a controller for managing the speech memory such that the speech memory is provided with a number of user memory areas which respectively have a variable memory capacity, each of said user memory areas being allocated to a different one of the users, such that the speech memory includes a common memory area, the common memory area comprising a remaining memory area of the speech memory remaining after the allocation of the user memory areas to the plurality of users. The controller including means for further allocating at least an additional portion of the common memory area to at least one of the respective user memory areas, and means for further controlling a retransfer of the additional portion of the common memory area back to the common memory area when the additional portion of the common memory area is no longer required so that a size of each user memory area is variable within predetermined limits based on an actual memory area requirement of each of the users.

Accordingly, a speech memory is managed in such a way that a memory area of variable size is allocated to each user, and that by access to a common memory area, the size of each user's memory area can be adapted to the user's memory requirements. Thus, each user is continuously allocated only as much memory space as needed, so that this user and further users can access as much of the remaining memory space as possible if required.

BRIEF DESCRIPTION OF THE DRAWINGS

The invention will now be described by way of example with reference to the accompanying drawings, in which.

DETAILED DESCRIPTION

Figure 1:
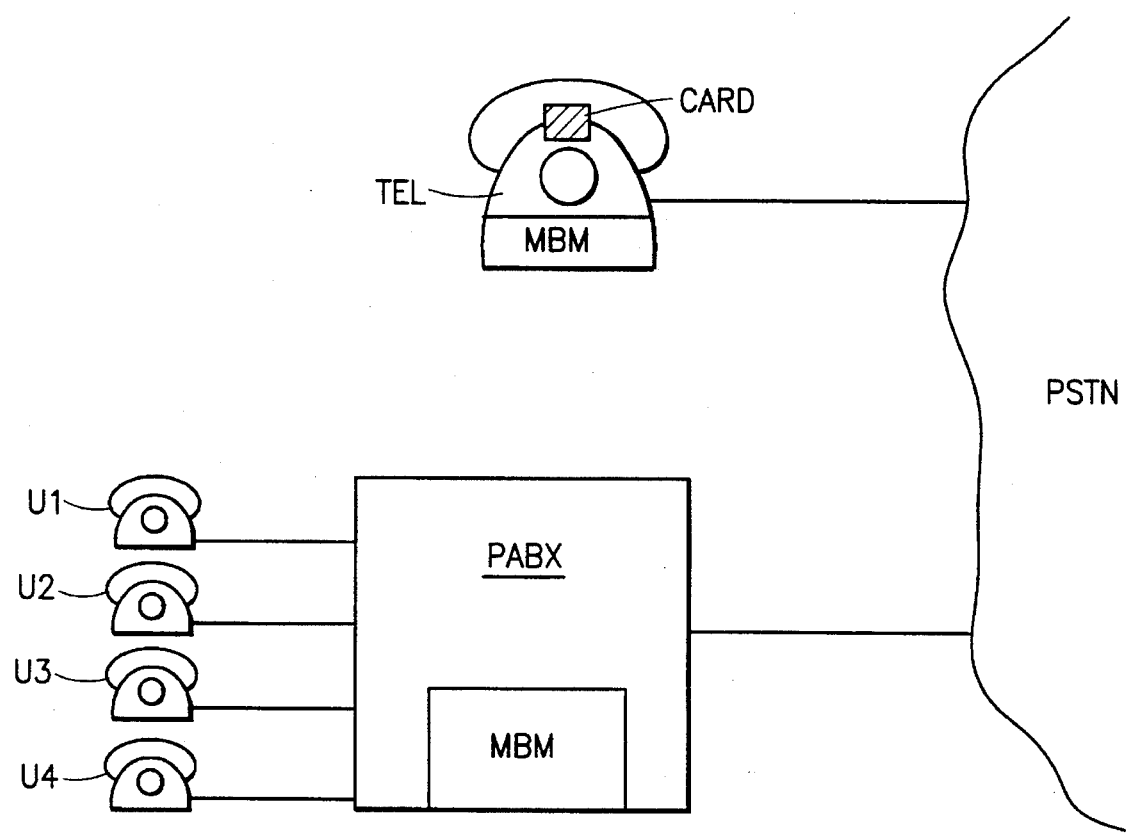
FIG. 1 shows schematically different telecommunications facilities implemented in accordance with the invention, which are connected to a public telecommunication network.

FIG. 1 shows two telecommunications facilities—a telecommunications system PABX and a telecommunications terminal TEL—which are connected to a public telecommunication network PSTN. The telecommunications system PABX, which can be accessed by, e.g., four users U1 to U4, includes an assembly MBM with a speech memory which serves as a voice mailbox. The telecommunications terminal TEL, which can be accessed by several users via identifying means, such as a chip card CARD, is connected to an assembly MBM which contains a speech memory and is used as a telephone answering set.

FIG. 1 shows schematically the design of telecommunications facilities with the novel assembly MBM, which is described below with the aid of FIGS. 2a and 2b.

Figure 2A:
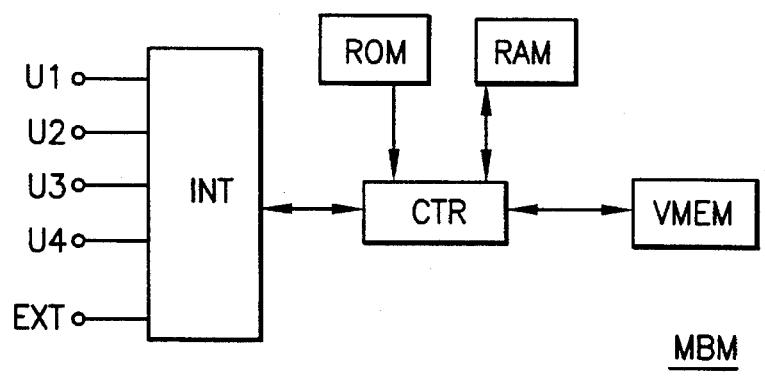
FIG. 2a is a block diagram of an assembly with a speech memory.
Figure 2B:
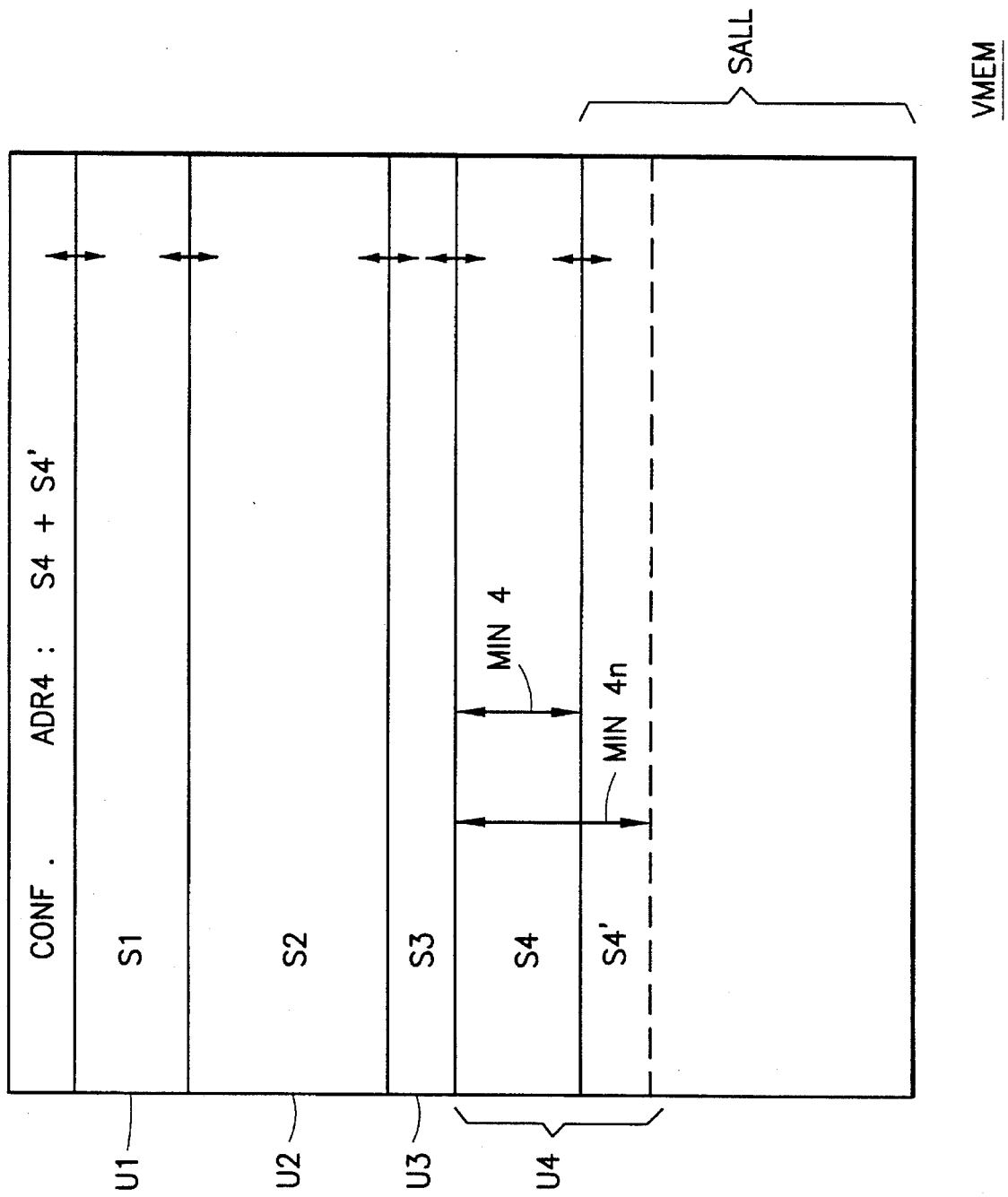
FIG. 2b shows schematically the division of the speech memory according to the invention.

FIG. 2a is a simplified block diagram of an assembly MBM which can be used as a speech-memory module in various communications facilities, particularly in telecommunications facilities. The assembly MBM of FIG. 2a contains a microcontroller CTR, a speech memory VMEM, an interface circuit INT, a read-only memory ROM, and a main memory RAM. The microcontroller CTR is connected to the other subassemblies and controls the management of the speech memory VMEM, e.g., a semiconductor memory with a capacity of 2.4 Mbytes. The speech memory VMEM can be accessed via the interface circuit INT by, e.g., four users U1, U2, U3, and U4. In this example, the assembly MBM serves as a voice mailbox for the users U1 to U4 of a telecommunications system.

Third parties EXT who want to deposit a message for a user can do so only if the mailbox of that user has free memory space. The assembly manages the speech memory VMEM in such a way that the memory capacity is effectively utilized so that as much free memory space as possible can be made available to the users. To this end, the microcontroller CTR controls a dynamic division of the speech memory VMEM as is illustrated by way of example in FIG. 2b.

The speech memory VMEM is divided into different memory areas of a size which is variable within limits. Each of the user memory areas S1, S2, S3, S4 is allocated to one of the users U1, U2, U3, U4. This allocation is stored in an address memory area CONF at locations indicated by pointers ADR4, each of which is assigned to one of the users U4. The remaining memory area is at the disposal of all users as a common memory area SALL.

The user memory areas S1 to S4 are adapted in size to the minimum memory space requirements of the respective user. The user memory area S4, for example, has a size Min4 of 960 kbytes. At a sampling rate of, e.g., 8 kHz with a resolution of 8 bits=1 byte and speech-data encoding with a data reduction factor of 4, messages with a total duration of 8 min=480 sec=960 kbytes/( 8 kbytes.sec$^{-1}$/4) can be stored in the user memory area S4. If this user memory area S4 has already been used up, the microcontroller CTR will control an allocation of a portion S4' of the common memory area SALL to this user memory area if further messages for the user U4 are to be stored.

Through the addition of the portion S4' with a memory size of, e.g., 40 kbytes, the user U4 has access to a voice mailbox with a memory space of 1 Mbyte. The added portion S4' is entered in the address memory area CONF at the location indicated by the pointer ADR4 (=S4+S4'). If this portion S4' becomes free again after the message has been read out, it will be transferred back to the common memory area SALL by deletion of the pointer address S4'. However, it is also possible not to retransfer this portion S4', at least temporarily, so that the user memory area of the user U4 has a newly defined minimum memory size Min4n. The common memory area SALL may also be added to the user memory area S4 as a whole.

The addition and retransfer of a portion of the common memory area is applicable to all user memory areas. Accordingly, the speech memory VMEM is dynamically divided so that, as far as possible, none of the users U1 to U4 will occupy free memory areas without using them.

The assembly for managing the speech memory may also control the selection of the memory sizes so that maximum memory sizes are fixed for the users. This allows one location within the common memory area SALL to be reserved for an additional user (see EXT in FIG. 2a).

To vary the size of the user memory area S4, it is advantageous to construct the user memory area from a variable number of memory segments of a fixed size. This segment size is adapted, for example, to operational requirements placed on the microcontroller CTR or to the structure of the speech data. In this example, the segment size is 512 bytes.

The size of the user memory area follows from the number of memory segments assigned to it. For the management of the speech memory VMEM and of its areas S1 to S4 and SALL, segment lists are stored in the address memory area CONF. Each segment list contains pointers which specify those memory segments which together form a memory area. For each memory segment, one pointer is stored. In this way, memory segments which are physically distributed within the speech memory in an arbitrary manner can be logically combined into one memory area.

Alternatively to the storage of segment lists, only one first pointer is stored in the address memory area CONF for each memory area. It specifies the first memory segment of a segment chain which forms the memory area. At the end of the first memory segment, i.e., at the last address in the first memory segment, a second pointer specifying the second memory segment is stored. Similarly, a third pointer specifying the third memory segment is stored in the second memory segment, etc. By the logic concatenation of the memory segments, memory areas of variable size are formed. To obtain access to the memory area, only one first pointer needs to be stored in the address memory area CONF.

The following describes the management of the speech memory VMEM, particularly the addition and retransfer of a portion of the common memory area. The portion comprises one or more of the above-described memory segments.

Figure 3A:
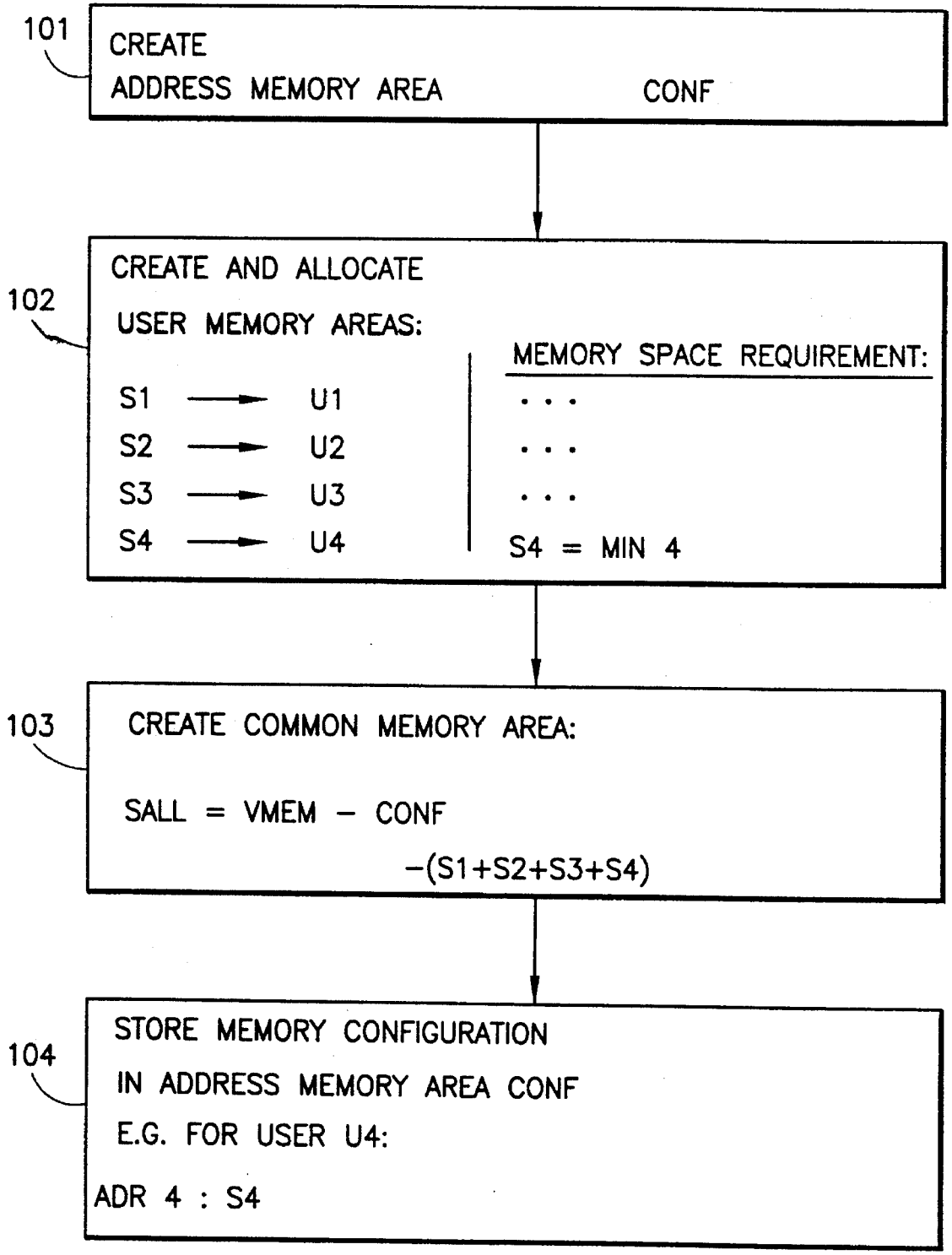
FIGS. 3a, 3b, and 3c are flowcharts showing the steps involved in carrying out the method according to the invention.

The management of the speech memory is illustrated in FIGS. 3a, b, and c, which are flowcharts for a method 100 in accordance with the invention.

FIG. 3a is a flowchart depicting, by way of example, the configuration procedure for the speech memory:

In a first step 101, an address memory area CONF, in which pointers or addresses specifying the configuration of the speech memory are stored, is created within the speech memory. In a second step 102, user memory areas S1, S2, S3, and S4 are created, which are assigned to users U1, U2, U3, and U4, respectively. Furthermore, boundary conditions are fixed, such as minimum memory size Min4 of one of the user memory areas S4. This is followed, in a third step 103, by the creation of a common memory area SALL, to which the remaining memory space VMEM-CONF-(S1+S2+S3+S4) is allocated. In a fourth step 104, the above-described configuration of the speech memory is stored in the address memory area CONF. There, each of the users is assigned a pointer ADR4 which specifies his user memory area.

Figure 3B:
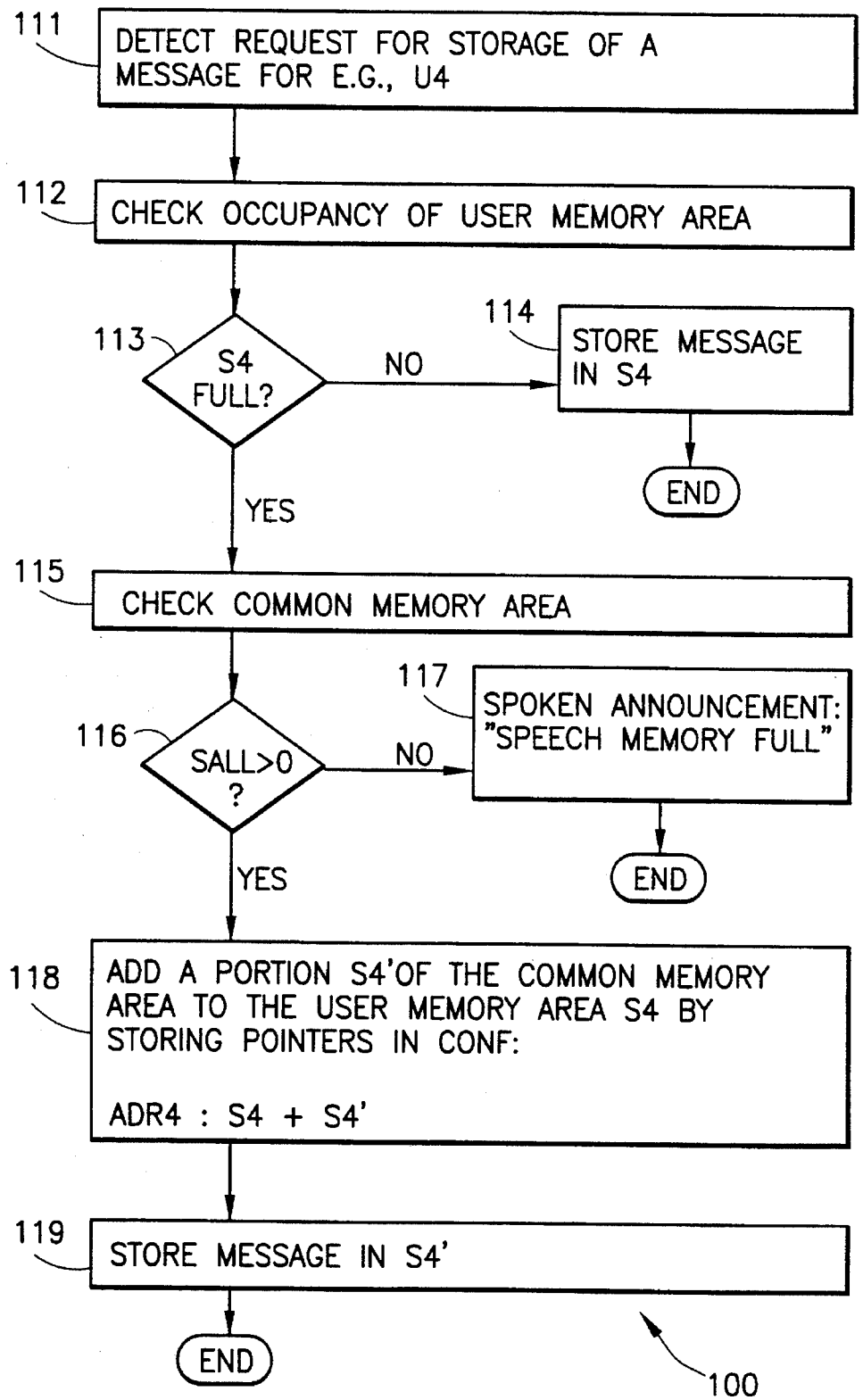

FIG. 3b illustrates, by way of example, the management of the speech memory during the storage of a message for one of the users U4:

In a first step 111, a request for the storage of the message is detected. This initiates a further step 112, in which the occupancy of the user memory areas S4 is checked, e.g., by reading the corresponding data from the address memory area CONF. A decision step 113 determines whether this user memory area is full. If "no", the message will be stored in S4 in a step 114. If "yes", a check of the common memory area SALL will be initiated in a step 115. In a decision step 116 it is determined whether the common memory area still contains free memory space (SALL>0?). If "no", a spoken announcement will be initiated in a step 117, giving the user U4 the information: "Speech memory full". If "yes", a portion S4' of the common memory area will be added to the user memory area S4 in a step 118. This is done by storing a pointer address S4' in the address memory area CONF. Then, in a step 119, the message of the user is stored in the added portion S4'.

Figure 3C:
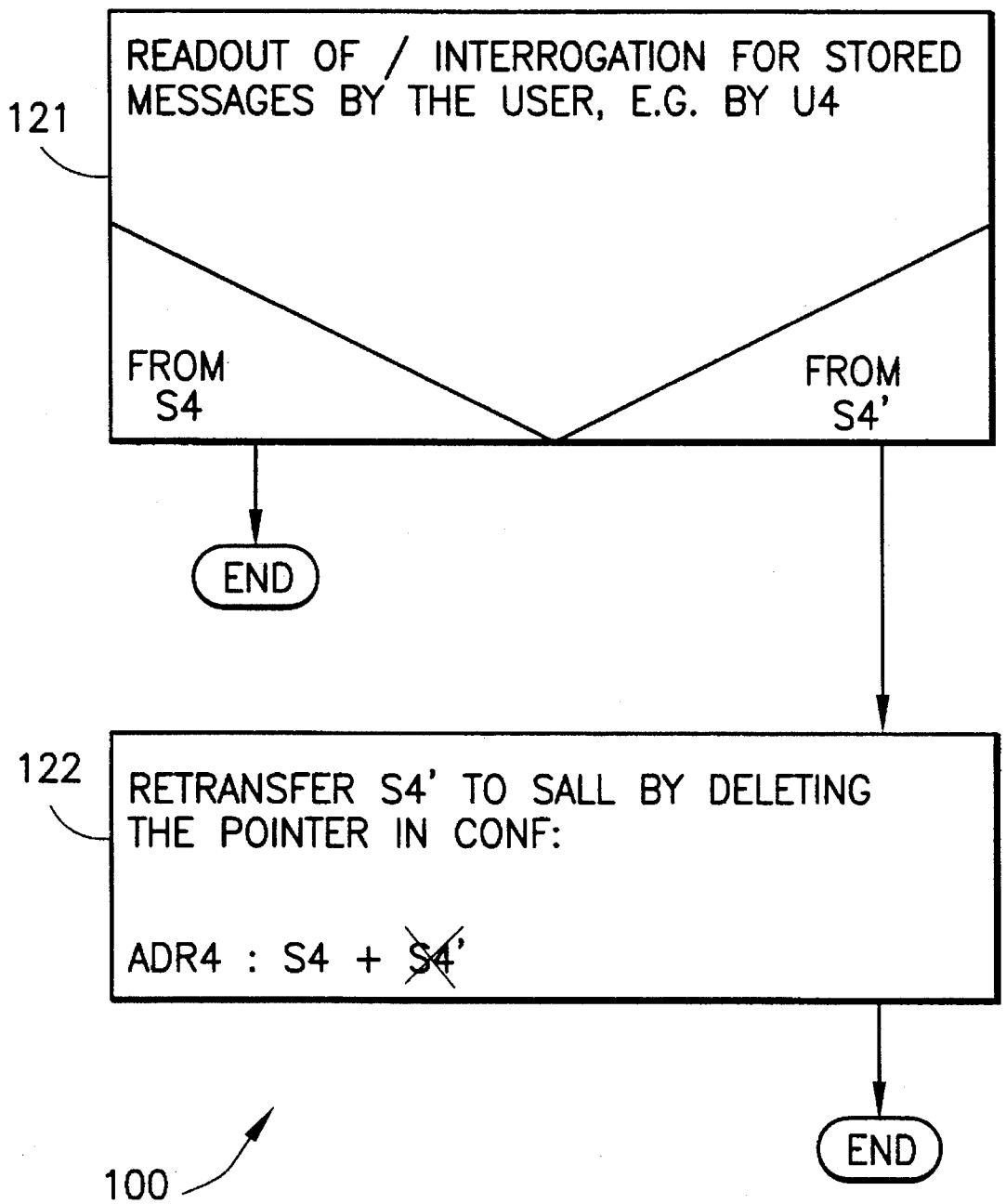

FIG. 3c illustrates, by way of example, the reading of a message from one of the user memory areas S4 or the added portion S4':

First, in a decision step 121, a check is made to determine where the message to be read is stored. If the message is stored in the added portion S4', the reading of the message will be followed, in a step 122, by the retransfer of this portion S4' to the common memory area SALL. This is done by deleting the pointer address for this portion S4' in the address memory area CONF. Thereafter, this portion is at the disposal of all users again.

While the invention has been described with reference to a few embodiments, it is not intended to be limited thereto. Many other embodiments of the invention are conceivable, such as in the areas of office communication, computer networking, or public information systems.

We claim:

1. A method of managing a speech memory (VMEM) which is accessible by a number of users, comprising the steps of:

dividing the speech memory (VMEM) into a plurality of user memory areas (S1, S2, S3 and S4), and a common memory area (SALL) before the speech memory is full, each user memory area having a variable size;

said dividing step including:

allocating, in a first allocating step (step 102), a respective one of the plurality of user memory areas (S1, S2, S3, S4) to each of a plurality of users (U1, U2, U3, U4); and allocating, in the second allocating step (step 103), at least a portion of the common memory area (SALL), which comprises a memory area of the speech memory (VMEM) remaining after the first allocating step, to a user (U1, U2, U3 or U4) requiring an additional memory area; and adjusting a size of a user memory area of the plurality of user memory areas (S1, S2, S3, S4) allocated in the first allocating step within predetermined limits so as to adapt (steps 111 through 122) the memory area allocated to each user to be a memory area required by each user (U1, U2, U3, U4);

said adjusting step including:

allocating, in a third allocating step, at least a variable portion (S4') of the common memory area (step 118) to that user memory area (S4) allocated to that one of the users (U4) requiring the additional memory area; and then transferring the at least a variable portion (S4') of the common memory area back to the common memory area (SALL) when the at least a variable portion (S4') of the common memory area is no longer needed to store data for that user (U4) previously requiring the additional memory area (S4').

2. The method as claimed in claim 1, further comprising:

creating within the speech memory (VMEM) an address memory area (CONF) which divides the speech memory and defines a memory configuration of the speech memory; and storing in the speech memory different pointers (ADR4) for each of the users (U1, U2, U3, U4), each different pointer identifying each user memory area allocated to one of the users (U1, U2, U3, U4).

3. The method as claimed in claim 1, wherein the adjusting step further comprises changing a size of a user memory area (S1, S2, S3, S4) so as to exceed a minimum limit value corresponding to a minimum memory area requirement of a respective user (Min4) and to fall below a maximum limit value corresponding to a maximum memory area requirement of the respective user.

4. The method as claimed in claim 1, wherein the first allocating step comprises allocating to each of the user memory areas (S1, S2, S3, S4) a variable number of memory segments, each memory segment having a fixed size.

5. The method as claimed in claim 4, wherein the allocation of the memory segments to each of the memory areas (S1, S2, S3, S4) comprises providing a segment list including at least one pointer which points to at least another allocated memory segment for a respective user.

6. The method as claimed in claim 4, wherein the allocating of the memory segments in the first allocating step comprises:

providing for a respective user a logic concatenation of a plurality of memory segments that are allocated to a memory area of the respective user;

placing in each of the user memory areas (S1, S2, S3, S4) a first pointer which points to a first one of the concatenated memory segments; and storing in each of the concatenated memory segments a further pointer which points to a next one of the memory segments allocated to the respective user.

7. The method as claimed in claim 1, wherein an outgoing message from a respective one of the users (U1, U2, U3, U4) and incoming messages from a plurality of third parties (EXT) to the respective one of the users are stored in the memory area allocated to the respective one of the users.

8. A speech memory (MEM) management apparatus comprising:

a speech memory (VMEM), that is accessible by a plurality of users (U1, U2, U3, U4); and a controller (CTR) for managing the speech memory (VMEM) such that the speech memory (VMEM) is provided in advance with a number of user memory areas (S1, S2, S3, S4) which respectively have a variable memory capacity, each of said user memory areas being allocated to a different one of the users (U1, U2, U3, U4), and the speech memory (VMEM) including a common memory area (SALL), said common memory area (SALL) comprising a remaining memory area of the speech memory (VMEM) remaining after the allocation of the user memory areas (S1, S2, S3, S4) to the plurality of users (U1, U2, U3, U4), and wherein the controller (CTR) includes means for further allocating at least an additional portion (S4') of the common memory area (SALL) to at least one of the respective user memory areas (S1, S2, S3, S4) and means for further controlling a transfer of the further allocated additional portion of the common memory area (S4') back to the common memory area (SALL) when the additional portion of the common memory area (S4') is no longer required so that a size of each user memory area is variable within predetermined limits based on a memory area requirement of each of the users (U1, U2, U3, U4).

9. The memory apparatus (MBM) according to claim 8, further comprising an interface circuit (INT) for one of a connection to and an incorporation into a telecommunications facility (PABX, TEL) that is accessible by the plurality of users (U1, U2, U3, U4).

10. A speech memory management apparatus for use in a telecommunications system (PABX) comprising:

a plurality of subscriber sets of a plurality of users (U1, U2, U3, U4); and a memory apparatus according to claim 8 that is operable as a voice mailbox, said subscriber sets being interconnectable with said memory apparatus.

11. A speech memory management apparatus for use in a telecommunications terminal (TEL) which is accessible by a plurality of users via identifying means (CARD), said telecommunication terminal (TEL) including a memory apparatus according to claim 8 that is operable as a voice mailbox, said telecommunication terminal being interconnectable with said memory apparatus.

* * * * *

UNITED STATES PATENT AND TRADEMARK OFFICE
CERTIFICATE OF CORRECTION

PATENT NO. : 5,483 578
DATED : January 9 1996
INVENTOR(S) : ACKERMANN et al.

It is certified that error appears in the above-indentified patent and that said Letters Patent is hereby corrected as shown below:

Title page, Item [73] Assignee, "Sel" should be

--ALCATEL SEL AKTIENGESELLSCHAFT
STUTTGART. GERMANY --

Signed and Sealed this

Seventeenth Day of September, 1996

Attest:

BRUCE LEHMAN

*Attesting Officer*    *Commissioner of Patents and Trademarks*